US011281227B2

(12) United States Patent
Saleem et al.

(10) Patent No.: US 11,281,227 B2
(45) Date of Patent: Mar. 22, 2022

(54) METHOD OF PEDESTRIAN ACTIVITY RECOGNITION USING LIMITED DATA AND META-LEARNING

(71) Applicants: VOLKSWAGEN AG, Wolfsburg (DE); AUDI AG, Ingolstadt (DE); PORSCHE AG, Stuttgart (DE)

(72) Inventors: Muneeb Saleem, Mountain View, CA (US); Nikhil J. George, Palo Alto, CA (US)

(73) Assignees: Volkswagen AG; Audi AG; Porsche AG

( * ) Notice: Subject to any disclaimer, the term of this patent is extended or adjusted under 35 U.S.C. 154(b) by 360 days.

(21) Appl. No.: 16/545,163

(22) Filed: Aug. 20, 2019

(65) Prior Publication Data
US 2021/0055737 A1    Feb. 25, 2021

(51) Int. Cl.
*G05D 1/02* (2020.01)
*G06K 9/00* (2022.01)
*G06N 3/08* (2006.01)

(52) U.S. Cl.
CPC ....... *G05D 1/0221* (2013.01); *G06K 9/00805* (2013.01); *G06N 3/088* (2013.01)

(58) Field of Classification Search
CPC ............. G05D 1/0221; G06K 9/00369; G06K 9/00791; G06K 9/00805; G06K 9/6271; G06N 3/088
See application file for complete search history.

(56) References Cited

U.S. PATENT DOCUMENTS

| 2017/0010617 A1* | 1/2017 | Shashua ............... G05D 1/0246 |
| 2018/0082587 A1* | 3/2018 | Wan ....................... B60Q 1/503 |
| 2018/0157972 A1 | 6/2018 | Hu et al. |
| 2019/0066373 A1 | 2/2019 | Tran et al. |
| 2019/0283746 A1* | 9/2019 | Shalev-Shwartz ... G05D 1/0246 |

(Continued)

FOREIGN PATENT DOCUMENTS

| CN | 109102025 A | 12/2018 |
| WO | 2019089591 A1 | 5/2019 |
| WO | WO-2019089591 A1 * | 5/2019 ......... G06K 9/00805 |

OTHER PUBLICATIONS

Kong et al.; Human Action Recognition and Prediction: A Survey; Cornell University Library; Jun. 29, 2018.

(Continued)

*Primary Examiner* — Babar Sarwar
(74) *Attorney, Agent, or Firm* — Barnes & Thornburg LLP

(57) ABSTRACT

Pedestrian activity recognition is embodied in a method, system, non-transitory computer-readable and vehicle. A Siamese neural network is trained to recognize a plurality of pedestrian activities by training it recordings of the same pedestrian activity from two or more separate training image capture devices. The Siamese neural network is deployed with continual data collection from an additional image capture device to create a dataset of clusters of similar activities in an unsupervised manner. A spatio-temporal intent prediction model is then trained that can be deployed to recognize and predict pedestrian activity. Based on the likelihood of a particular pedestrian activity occurring or currently being underway, an automatic vehicle maneuver can be executed to navigate the situation.

26 Claims, 8 Drawing Sheets

(56) References Cited

U.S. PATENT DOCUMENTS

| | | | | |
|---|---|---|---|---|
| 2019/0384294 A1* | 12/2019 | Shashua | ............... | G05D 1/0088 |
| 2020/0209864 A1* | 7/2020 | Chen | ................. | G01C 21/3811 |
| 2020/0209873 A1* | 7/2020 | Chen | ................. | G06K 9/00805 |
| 2020/0211154 A1* | 7/2020 | Ng | ...................... | G06T 3/0093 |
| 2020/0223451 A1* | 7/2020 | Shashua | ............... | B60W 30/09 |
| 2020/0349425 A1* | 11/2020 | Saha | ....................... | G06N 3/08 |

OTHER PUBLICATIONS

Rasouli et al.; Are They Going to Cross? A Benchmark Dataset and Baseline for Pedestrian Crosswalk Behavior 2017 IEEE International Conference on Computer Vision Workshops; IEEE; Oct. 22, 2017; pp. 206-213.

Rasouli et al.; Joint Attention in Driver-Pedestrian Interaction: from Theory to Practice; Cornell University Library; Feb. 7, 2018.

Search Report for International Patent Application No. PCT/EP2020/072730; dated Nov. 19, 2020.

Feichtenhofer et al.; Spatiotemporal Residual Networks for Video Action Recognition; 30th Conference on Neural Information Processing Systems (NIPS); 2016; Barcelona, Spain.

Goroshin et al.; Unsupervised Learning of Spatiotemporally Coherent Metric; The IEEE International Conference on Computer Vision (ICCV); 2015; pp. 4086-4093.

Wu et al.; Where-and-When to Look: Deep Siamese Attention Networks for Video-based Person Re-identification IEEE Transactions on Multimedia; Jun. 2019; vol. 21, No. 6.

\* cited by examiner

METHOD OF PEDESTRIAN ACTIVITY RECOGNITION USING LIMITED DATA AND META-LEARNING

FIELD

The present disclosure relates to recognizing and interpreting the scene around a vehicle. In particular, the present disclosure relates to accurately identifying an activity currently undertaken by a pedestrian around the vehicle, and predicting the pedestrian's next activity.

BACKGROUND

Correctly recognizing and interpreting the scene around a vehicle is imperative to enable an autonomous or semi-autonomous vehicle to safely maneuver around or otherwise avoid obstacles and pedestrians. Properly programming these smart vehicles with intelligent functionalities typically requires very large annotated datasets to create and train supervised machine learning models to classify pedestrian activities. The data is generally hand labelled, which is time consuming and expensive. These complex hand-tuned human-motion based models do not always generalize to new or unseen conditions.

Therefore, a need exists for an efficient method of pedestrian activity recognition using limited data and meta-learning.

SUMMARY

A method, system and non-transitory computer-readable for pedestrian activity recognition is disclosed. Further disclosed is a vehicle containing a pedestrian activity recognition system. In illustrative embodiments, a Siamese neural network is trained to recognize a plurality of pedestrian activities by training it on two or more inputs, wherein the inputs are recordings of the same pedestrian activity from two or more separate training image capture devices. The Siamese neural network is deployed with continual data collection from an additional image capture device to create a dataset of a plurality of activity clusters of similar activities in an unsupervised manner. The Siamese neural network automatically annotates activities to create an annotated predictive dataset and an annotated non-predictive dataset. A spatio-temporal intent prediction model is then trained using spatio-temporal data samples from the non-predictive annotated dataset and the spatio-temporal data sample from the predictive annotated dataset as input. This predictive model can then be deployed to recognize and predict pedestrian activity. Based on the likelihood of a particular pedestrian activity occurring or currently being underway, an automatic vehicle maneuver can be executed to navigate the situation.

DESCRIPTION OF DRAWINGS

The detailed description refers to the accompanying figures, all of which depict illustrative embodiments.

FIG. 3 is a block diagram of an illustrative Siamese neural network that generates an output indicating that two images are similar.

DETAILED DESCRIPTION OF EMBODIMENTS

The figures and descriptions provided herein may have been simplified to illustrate aspects that are relevant for an understanding of the described devices, systems, and methods, while eliminating, for the purpose of clarity, other aspects that may be found in typical devices, systems, and methods. Those of ordinary skill may recognize that other elements or operations may be desirable or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that could be implemented by those of ordinary skill in the art. All embodiments are illustrative of the broader scope of the concepts described herein.

Disclosed embodiments provide a method, system, vehicle and non-transitory computer readable medium for recognition of pedestrian activity. Illustrative embodiments may recognize and interpret a scene around a vehicle, including identifying different activities engaged in by a pedestrian and predicting the next activity in which the pedestrian may be involved. Based on the detected or predicted pedestrian activity, a vehicle may automatically perform a safety maneuver, such as controlling the speed of the vehicle or maneuvering the vehicle in a new direction. In addition or alternatively, a warning signal may be generated upon detection or prediction of certain pedestrian activity.

Neural networks are a set of algorithms designed to recognize patterns. Illustrative embodiments of a pedestrian recognition method and system use neural networks to group data based on similarities found in videos of pedestrian activity. The neural networks are trained on labeled datasets. The datasets may be labelled automatically, i.e. in an unsupervised or semi-supervised manner. Illustrative embodiments include steps to train neural networks further, deployment of the trained neural networks to recognize pedestrian activity. Further training allows the neural networks to predict pedestrian activity.

Figure 1:
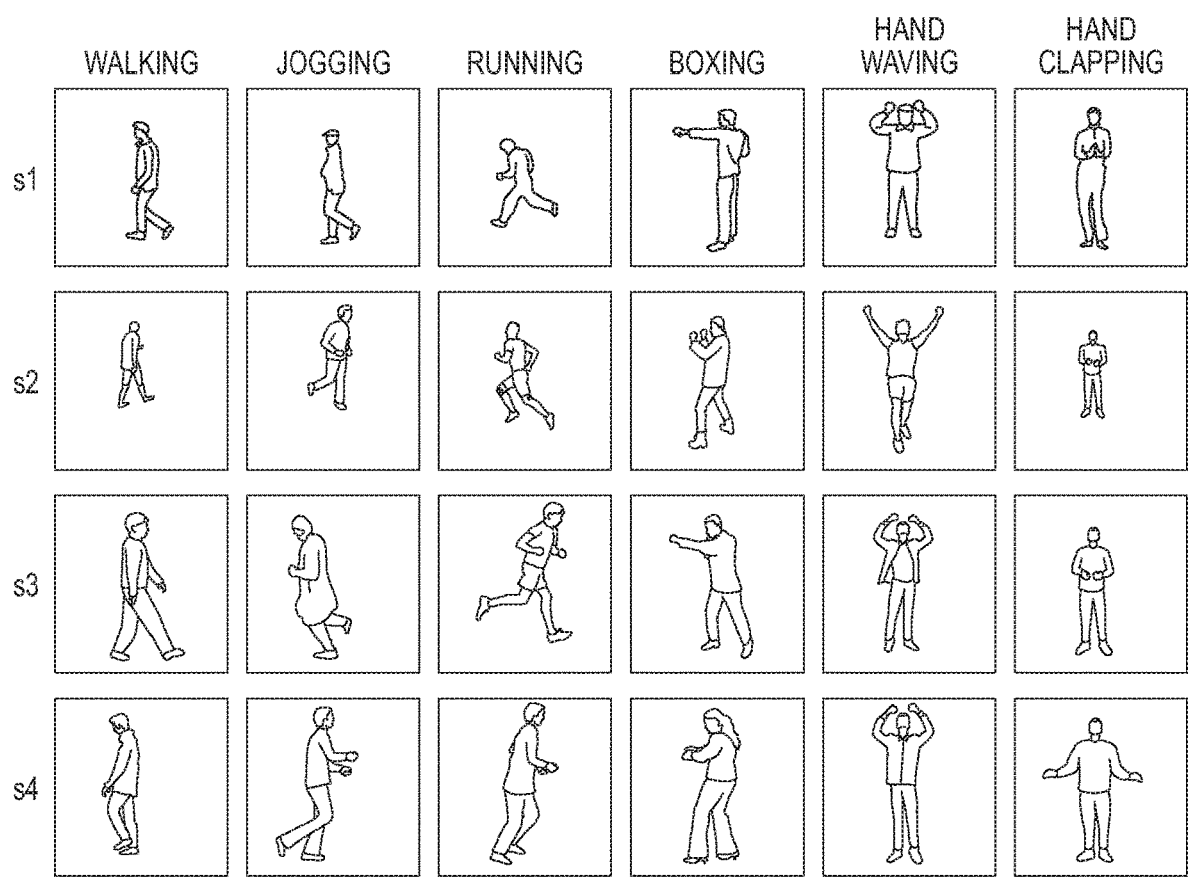
FIG. 1 depicts illustrative types of pedestrian activities that a neural network may be trained to recognize.

FIG. 1 depicts illustrative types of pedestrian activities that a neural network may be trained to recognize. The activity types include walking, jogging, running, boxing, hand waving and hand clapping. Four different examples are provided for each activity type. Using machine learning, a computer can be trained to identify similarities between different images of the same type of activity. For example, a jogging person typically takes shorter strides than a running person does. There may be additional identifying characteristics such as arm motions, timing of changes to pedestrian stances and positions within the environment, that can be identified in videos. For pedestrian activity annotations may include activity types, and may also include more specific labels, for example, walking on a sidewalk, walking towards a paved road, crossing a road, walking in a crosswalk, running, sitting on a curb, waving to another pedestrian, waving to a camera, looking in the direction of a camera or vehicle, walking hastily, and walking carefully. In traditional supervised learning, the images would be annotated by hand with an activity type label. Illustrative embodiments described herein annotate or label images automatically.

Figure 2:
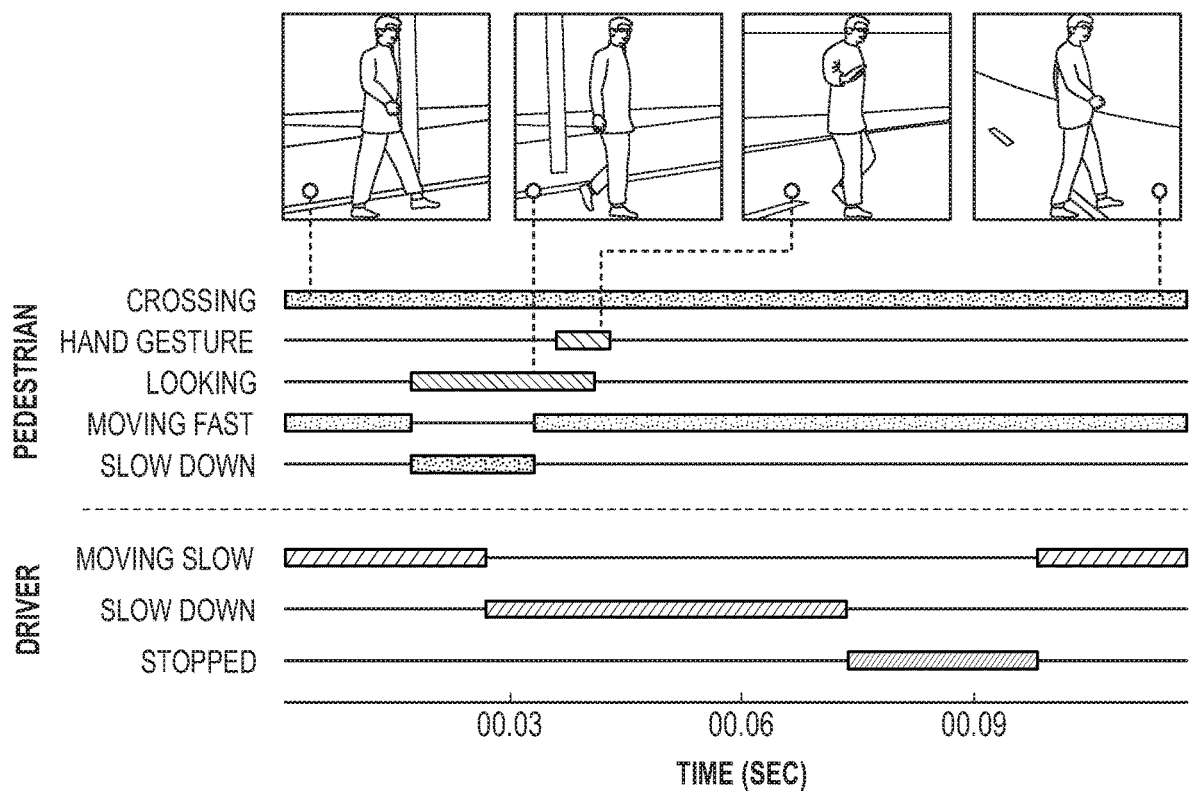
FIG. 2 depicts an illustrative timeline of a pedestrian stepping from a curb into a roadway.

FIG. 2 depicts an illustrative timeline of a pedestrian stepping off a curb and entering the roadway. FIG. 2 further depicts how a driver may react to encountering the pedestrian activity. Throughout a period of time depicted, the pedestrian is crossing the road. This is shown in the top horizontal line designated as "crossing." During a portion of the period of time, the pedestrian is looking, such as away from the direction of travel or intended travel. This is shown in the second image and presented on the third line of the pedestrian activity list. This activity may be identified by a change in the position of the pedestrian's head or gaze direction, for example. In the third image from the left, during a small portion of the entire period of time, the pedestrian uses a hand gesture. The diagram also shows two non-contiguous portions of the period of time depicted in which the pedestrian is moving fast, such as running, represented on the fourth line of the pedestrian activity list. Between those two portions of the time period during which the pedestrian is running, the pedestrian has slowed down. The images are time stamped and annotated with activity designations such as crossing, hand gesture, looking, moving fast and slowing down. By using time stamps, a supervised learning model may not be needed, thereby simplifying the process and reducing the amount of time and computing power needed. In conventional, supervised models, the annotations are associated with the images by human input. In illustrative embodiments of the disclosed method and system, the labeling is performed automatically.

In FIG. 2, below the pedestrian activity labels, illustrative driver actions are shown, representing how a driver may react to the pedestrian activity. These may also be considered vehicle actions, particularly for an autonomous or semi-autonomous vehicle. During an initial, approximate 0.03 second period of time, the vehicle is moving slowly. The vehicle then slows further from just before the 0.03 second point to about the 0.08 second point. The vehicle then comes to a stop, and remains stopped until just after the 0.09 second point. The vehicle then begins to move slowly again. The duration of each activity, the action type and the initiation time with respect to the pedestrian activity is illustrative and may vary depending on the activity and vehicle capabilities.

In an illustrative embodiment, a Siamese neural network is trained to recognize a plurality of pedestrian activities. Data is obtained for input to the Siamese neural network that includes two or more recordings of the same pedestrian activity from two or more separate training image capture devices. Pedestrian activity may be, for example, running, looking, walking, jogging, hand waving, or any other pedestrian activity that can be differentiated from other pedestrian activities and categorized.

Figure 3:
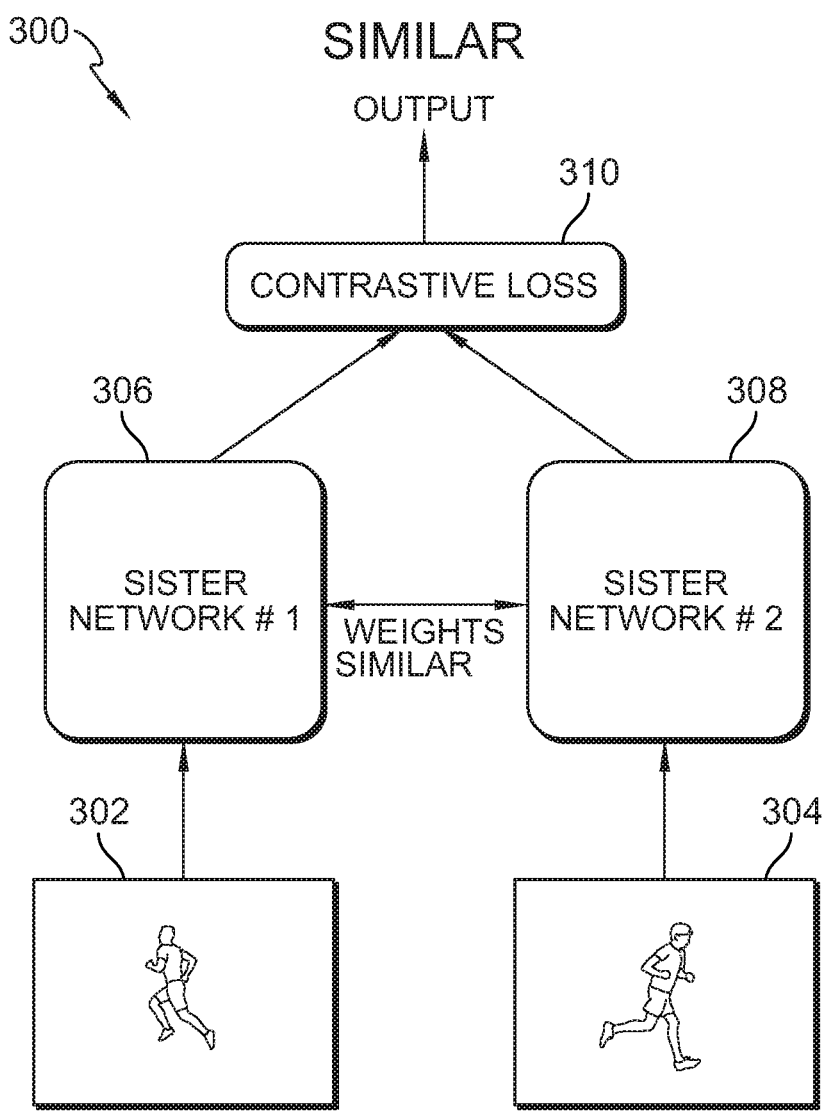

The term "Siamese neural network" is used herein for a model that is trained on two or more different inputs that enable it to predict whether the inputs are 'similar' or 'dissimilar'. The term "Siamese neural network" will be used herein for any model having those capabilities. In illustrative embodiments, a spatiotemporal variant of a Siamese neural network is used that can tell whether two or more image sequences or videos are similar or dissimilar. In an illustrative embodiment data from different time stamps, for example separated in time by one minute, would be dissimilar approximately ninety percent of the time. The greater the difference in time stamps the more likely the activity predicted would be dissimilar FIG. 3 is a block diagram of an illustrative Siamese neural network 300 that generates an output indicating that two images are similar. A first image 302 of a person running is compared to a second image 304, also of a person running. The Siamese neural network has been trained using weights to maximize the neural network's accuracy. The training can be implemented by making incremental adjustments to the weights. The weighting facilitates two very similar images being mapped to the same location. Here the Siamese neural network has been trained sufficiently to be used as an analytical tool on new image inputs, namely first image 302 and second image 304.

Twin networks 306, 308 are joined by a function 310. Input images, first image 302 and second image 304, are filtered by one or more hidden or middle layers in a feature extraction process. Each filter picks up a different signal or feature to determine how much overlap there is between the new image and the reference image or images for various types of pedestrian activity. As an image is passed through the various filters it is described mathematically. Various types of feature engineering may be used to map image features. A loss or cost function is calculated based on feature similarity. In an illustrative embodiment, a triplet cost function is used. A threshold or range is provided as a basis of designating images as "similar" or "dissimilar".

Illustrative embodiments focus on detecting similarities and dissimilarities between multiple different activities. This approach, called "metric learning," is a field of meta-learning within the larger scope of machine learning. This method may have the prominent advantage of requiring significantly less annotated data for learning new activities or categories, and even orders of magnitude less.

Figure 4:
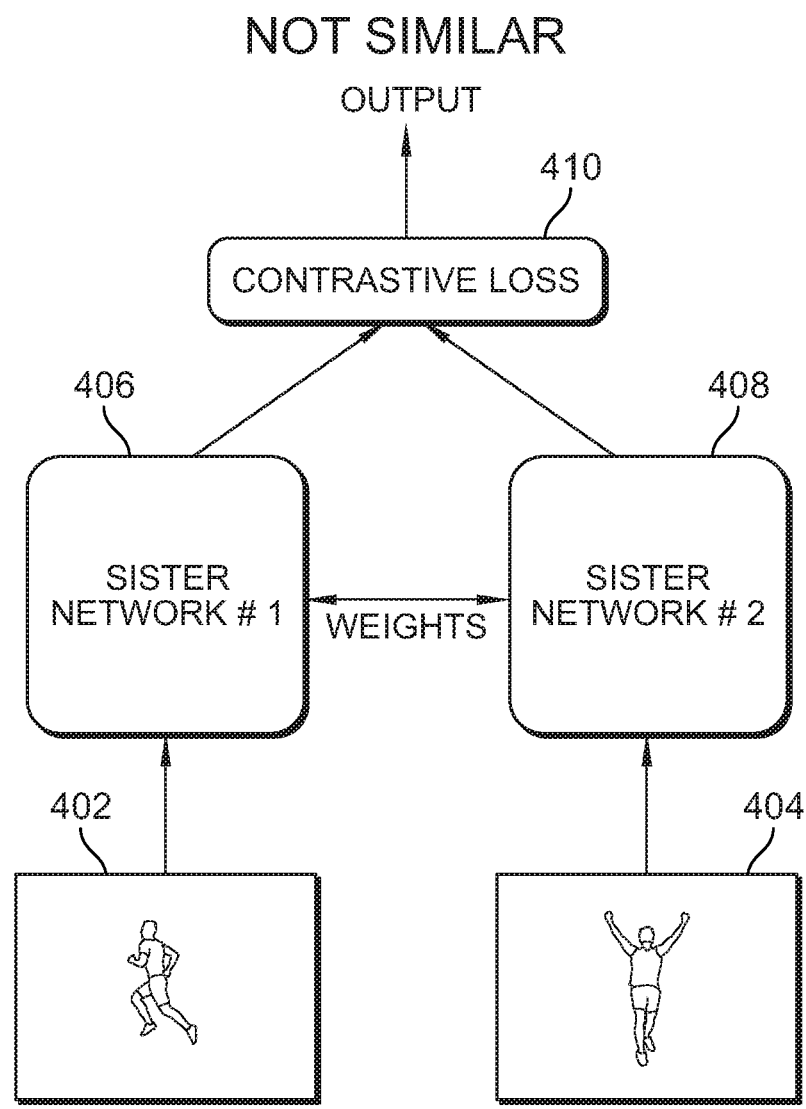
FIG. 4 is a block diagram of an illustrative Siamese neural network that generates an output indicating that two images are dissimilar.

FIG. 4 is a block diagram of an illustrative Siamese neural network 400 that generates an output indicating that two images are dissimilar. First image 402 depicts a person running. Second image 404 depicts a person standing with his arm raised above his head. Trained twin networks 406, 408 process the images and provide a similarity measure in block 410 that does not meet the threshold for being designated as "similar." Accordingly, the system outputs a conclusion that the images are dissimilar.

The functionality described with respect to FIGS. 3 and 4 may be used to predict whether two different pedestrian activities are the same or different, predict which known activity a new activity matches, and predict that a new activity is not known in prior observed data. The Siamese neural network may also be used to identify a new pedestrian activity category. Additionally, the Siamese neural network may be configured to predict in what subsequent activity an observed pedestrian may engage by categorizing activity recordings based on what pedestrians do subsequently instead of what they do currently.

Figure 5:
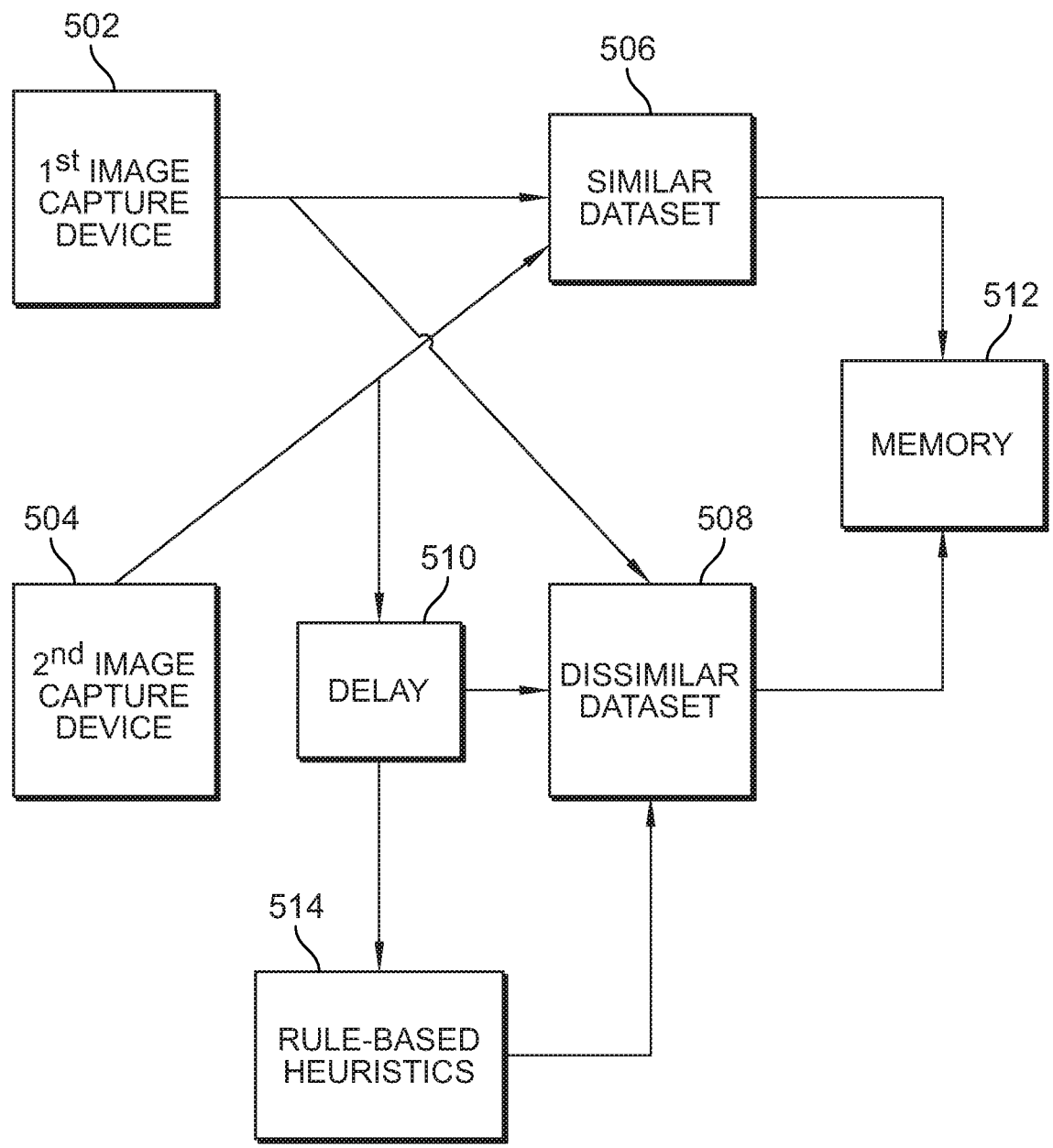
FIG. 5 is a block diagram depicting an illustrative method of obtaining images and creating datasets to train a Siamese neural network to recognize pedestrian activities.

FIG. 5 is a block diagram depicting an illustrative method of obtaining images and creating datasets to train a Siamese neural network to recognize pedestrian activities. In an illustrative embodiment, data is collected to train the Siamese neural network to recognize a plurality of activities by training it on two or more inputs, wherein the inputs are recordings of the same pedestrian activity from two or more separate training image capture devices 502, 504. A similar dataset 506 and a dissimilar dataset 508 are created and stored in memory 512 of a type suitable for and compatible with the intended pedestrian recognition method and system.

Figure 6:
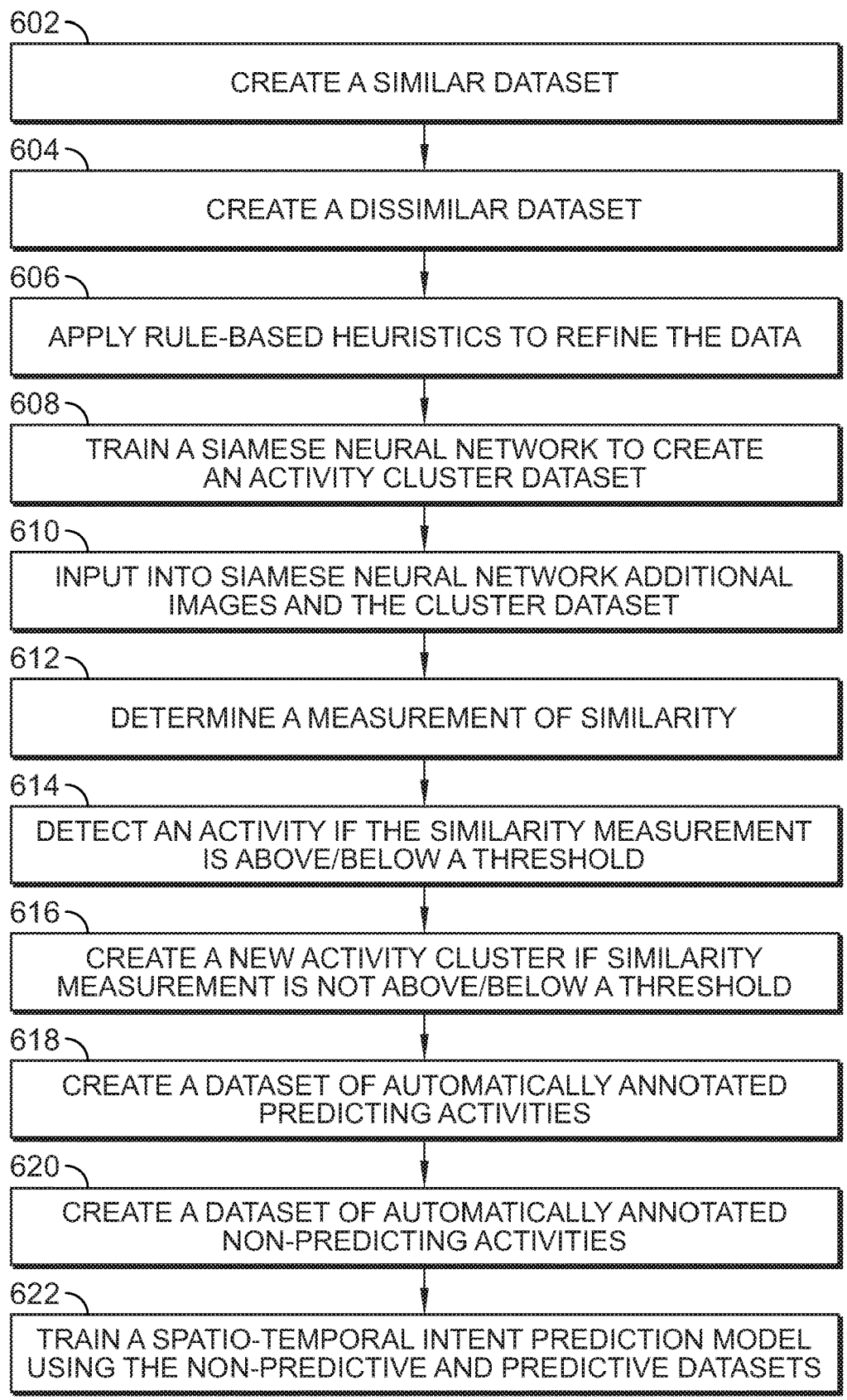
FIG. 6 is a flow chart of an illustrative method of training and deploying a Siamese neural network to recognize and predict pedestrian activity.

FIG. 6 is a flow chart of an illustrative method of training and deploying a Siamese neural network to recognize and predict pedestrian activity. In step 602 a similar dataset 506 is created from an output from first training image capture device 502 and a synchronized output from second training image capture device 504, wherein the outputs reflect the same pedestrian activity. It is noted that a plurality of training image capture devices may be used of which the first training image capture device and the second training image capture device are a part.

It may be assumed that the synchronized image capture devices are recording the same pedestrian activity because they are capturing images at the same time and are positioned to capture pedestrian activity in the same spatial area. Accordingly, data collected from each camera may be automatically annotated as "similar" for training the Siamese neural network.

In step 604 dissimilar dataset 508 is created from the output from first training image capture device 502 and a delayed output 510 from second training image capture device 504, wherein the outputs reflect different pedestrian activities. The delay is predefined, and may be for example, 30 seconds, or by further example, in the range of about 10 seconds to about 30 seconds. It may be assumed that the delay produces images of different pedestrian activities so the images may be automatically annotated as dissimilar. The delay duration may be chosen, for example, based on the location of the image capture devices, wherein the location may give rise to particular types of pedestrian activity. Pedestrian activity may vary depending on the environment, which can affect how a pedestrian reacts or what activities they engage in, and the sequence of such activities.

Optionally, in step 606, similar dataset 506 and the dissimilar dataset 508 are refined by applying rule-based heuristics 514 to delayed output 510 from second training image capture device 504 and to the output of first training image capture device 502 to evaluate for dissimilarities.

In step 608, the illustrative embodiment further includes creating a dataset comprising a plurality of pedestrian activity clusters. The activity cluster dataset is created by training a Siamese neural network on the similar dataset and the dissimilar dataset to create a dataset comprising a plurality of activity clusters. The activity cluster dataset is thus created in an unsupervised manner.

More specifically, in an illustrative embodiment, the Siamese neural network may be trained in step 608 using the similar dataset created in step 602 and the dissimilar dataset created in step 604. The neural network is trained to establish whether the two datasets input to the Siamese neural network belong to the same activity, and thus should reside in the same activity cluster, or whether they belong to different activities.

In step 610 the Siamese neural network may be deployed with continual data collection input from an additional image capture device and input from the database containing the plurality of activity clusters formed in step 608. Each activity can be stored by its name or a numeric ID number that corresponds to the ID's the other samples that are categorized into the cluster, as created in step 608. This may be accomplished by inputting into the Siamese neural network that comprises the plurality of activity clusters, output from the additional activity image capture device and also inputting into the Siamese neural network a database of the plurality of activity clusters. The additional image capture device may be one of the training image capture devices 502, 504, but for the purpose of clarity, it will be referred to as the additional image capture device when used for continual data collection.

In step 612, the Siamese neural network determines a measurement of similarity between the additional activity image capture device output and a data sample of each of the plurality of activity clusters to determine whether the additional activity matches an existing cluster sample. In step 614 the Siamese neural network detects an activity if the additional activity image capture device output belongs to one of the plurality of activity clusters. More specifically, in an illustrative embodiment, after obtaining the similarity scores for all pairs of samples that are found to be similar to each other, the samples are plotted close to each other, hence forming clusters. A clustering algorithm, for example k-means, Gaussian Mixture, Model, or other cluster analysis algorithm compatible with the method, is run to give identities to each cluster, i.e. serial numbers or labels. After the clustering algorithm is executed, optionally, a human may manually look at the activities contained inside each cluster and adjust them, for example by merging two clusters into one or splitting a cluster into two clusters.

In step 616, a new cluster associated with the current activity output is created if the similarity measurement is outside of a designated measurement range for all of the plurality of existing activity clusters. The new activity cluster is then added to the existing plurality of activity clusters. The Siamese neural network may then detect an activity if additional activity image capture device output belongs to the new activity cluster. In this way the system uses the spatiotemporal Siamese neural network model to cluster similar activities in a semi-supervised manner without requiring access to massive amounts of annotations hand-labeled by humans.

In steps 618, 620 the Siamese neural network may be employed to automatically annotate activities as predictive activity or not predictive activity to create an annotated predictive dataset and an annotated non-predictive dataset. To create a dataset annotated as predicting activities, in step 618 the Siamese neural network is employed by an annotating algorithm to annotate' activity samples according to a defined time period based logic. In other words, the algorithm annotates image capture device output associated with pedestrian activity captured during a designated time period prior to a detected activity by labeling it as predictive of the detected activity.

An illustrative embodiment follows of a method of predicting a pedestrian activity before it happens, ("pedestrian intent prediction"). A collected dataset has a full chronological record of each event that happens in sequence. The trained Siamese neural network model is used to detect, for example, when a pedestrian action, for example waving or making a hand gesture. In this illustrative example, a pedestrian action is detected at time t=25 seconds. A fixed offset from the time of the pedestrian action is provided, for example dt=10 seconds. An annotation time period is designated, for example, 5 seconds. Based on the fixed offset of dt=10 seconds and the 5 second annotation period, the dataset from t=25-dt-5 to t=25-dt seconds can be annotated as containing predictive information for the target pedestrian activity. So annotated imagery will be from t=10 to t=15 seconds.

Referring back to FIG. 2, the Siamese neural network model detects a hand gesture, identified in the third image from the left, during a time period represented by a bar in the second line from the top. When the Siamese neural network model makes a positive detection of the hand gesture, the segment can be annotated over a fixed time before the onset of the detected hand gesture as a predictive segment/activity. Thus, the "slow down" segment in the fifth line from the top can be considered as predictive of making a hand gesture because it occurred in a period of time preceding the hand gesture.

Negative samples of pedestrian activity may be created in step 620 from image capture device output in which pedestrian activities are not detected. A negative sample of pedestrian activity is one that is captured during a designated time period prior to a time segment in which one of the plurality of activity clusters was not detected. Such a pedestrian activity is automatically labeled as not predictive of one of the plurality of activity clusters. A dataset of the pedestrian activity annotated as not predicting activities is created.

In step 622, using the spatio-temporal data samples from the non-predictive annotated dataset and the spatio-temporal data sample from the predictive annotated dataset as input, a spatio-temporal intent prediction model is trained. The intent prediction model may then be deployed to assign a likelihood of a particular activity based on the predictive and non-predictive information.

Video of pedestrian activity is input to the intent prediction model. The intent prediction model compares the video to the non-predictive activity and the predictive activity to determine whether a pedestrian activity is likely to occur. In an illustrative embodiment, the intent prediction model may assign a likelihood of a particular activity by assigning a "1" if activity is predicted and assigning a zero if activity is not predicted. Other methods of assigning the likelihood of a particular activity may also be used in the intent prediction model. When employed in an autonomous or semiautonomous vehicle control unit, an automatic vehicle maneuver can be executed based on assignment of the likelihood of the particular activity. Additionally, or in place of, an audio or visual warning signal may be generated to alert a driver of a pedestrian in the vicinity. The visual warning may be presented on a display unit within the vehicle where the driver is likely to take notice.

Vehicle maneuvers produced in response to pedestrian activity may include, for example, slowing or stopping the vehicle by applying the brakes or redirecting the vehicle by changing the steering angle. Coordination with a navigation system may also be implemented to further automatically direct the vehicle to take safe precautionary actions.

Figure 7:
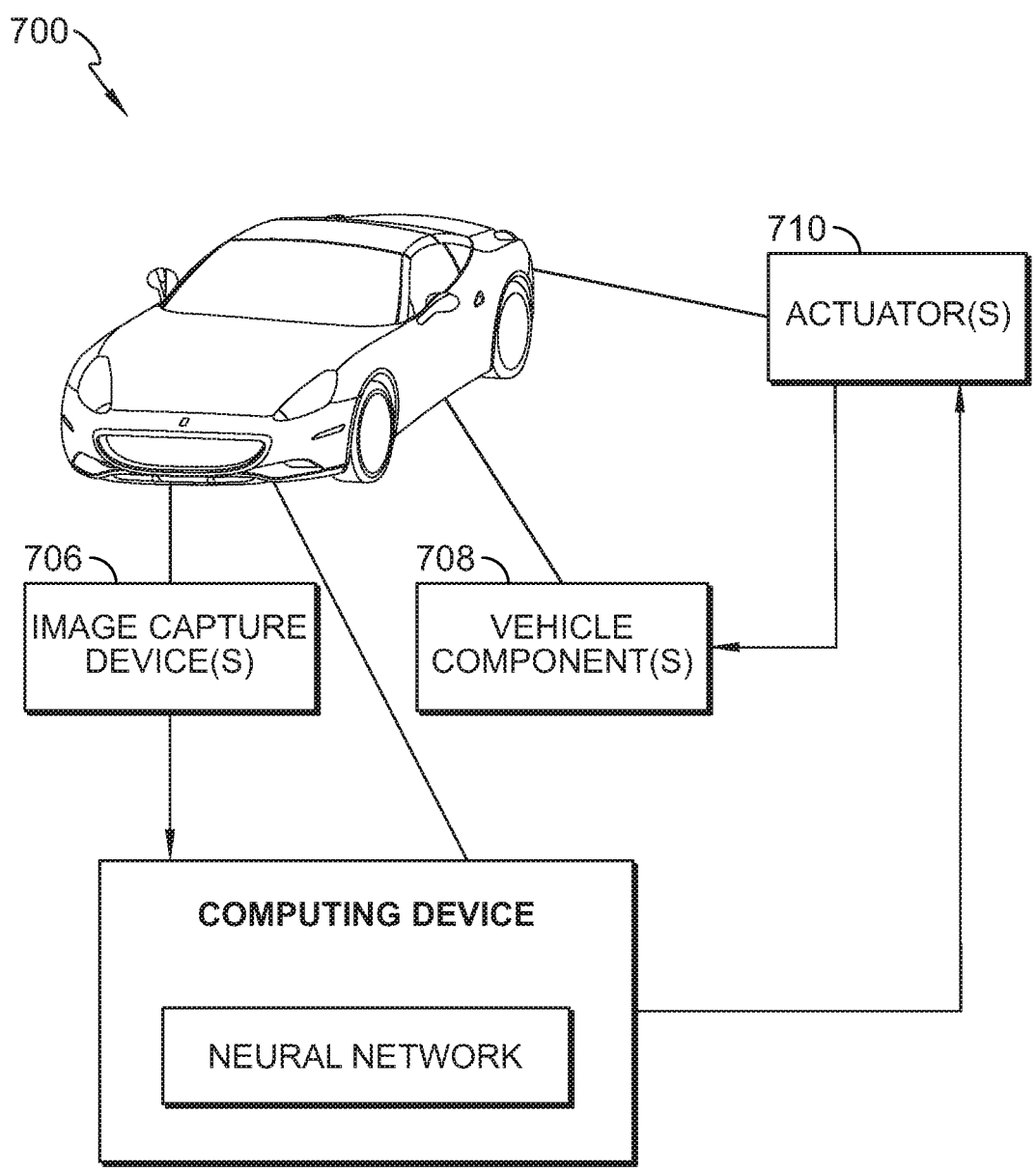
FIG. 7 is a block diagram of an illustrative autonomous or semi-autonomous vehicle and an associated driving system that recognizes pedestrian activity and causes the vehicle to execute an action based on the recognized activity.

FIG. 7 is a block diagram of an illustrative autonomous or semi-autonomous vehicle and an associated driving system that recognizes pedestrian activity and causes the vehicle to execute an action based on the recognized activity. Vehicle 700 includes a computing device 702 having a neural network 704 implemented as in steps of illustrative embodiments of the pedestrian recognition methods. Data from sensors 706, such as image capture devices contained on vehicle 700 are input to computing device 702. Computing device 702 contains a pedestrian recognition predictive model that acts on data from sensors 706 according to methods disclosed herein. Data from sensors 706 may include video data, which is processed according to multiple or single frames. Additional details of computing device 702 are shown in FIG. 6.

Vehicle 700 has various components 708, such a braking systems and steering system. Each system may have its own electronic control unit. The electronic control units may also be designed to control more than one vehicle system. One or more actuators 710 are associated with each vehicle component 708. Computing device 702 generates a signal based on input from sensors 706 The signal from computing device 702 is input to actuator 710 providing electronic instructions to act on the vehicle component 708 with which it is associated. For example, an actuator 710 may receive a signal from computing device 702 to stop vehicle 700. Actuator 710 would then activate the vehicle braking system to carry out the instructions from computing device 702.

The illustrative system depicted in FIG. 7 relies on input to computing device 702 from sensors 706 located on vehicle 700. In a further embodiment, computing device 702 may accept signals from external sensors, such as cameras affixed to infrastructure components, for example. Signals from the external sensors may be processed by computing device 702 to cause vehicle 700 to execute a safety maneuver. An onboard navigation system could be coordinated with computing device 702 to implement the maneuver.

Figure 8:
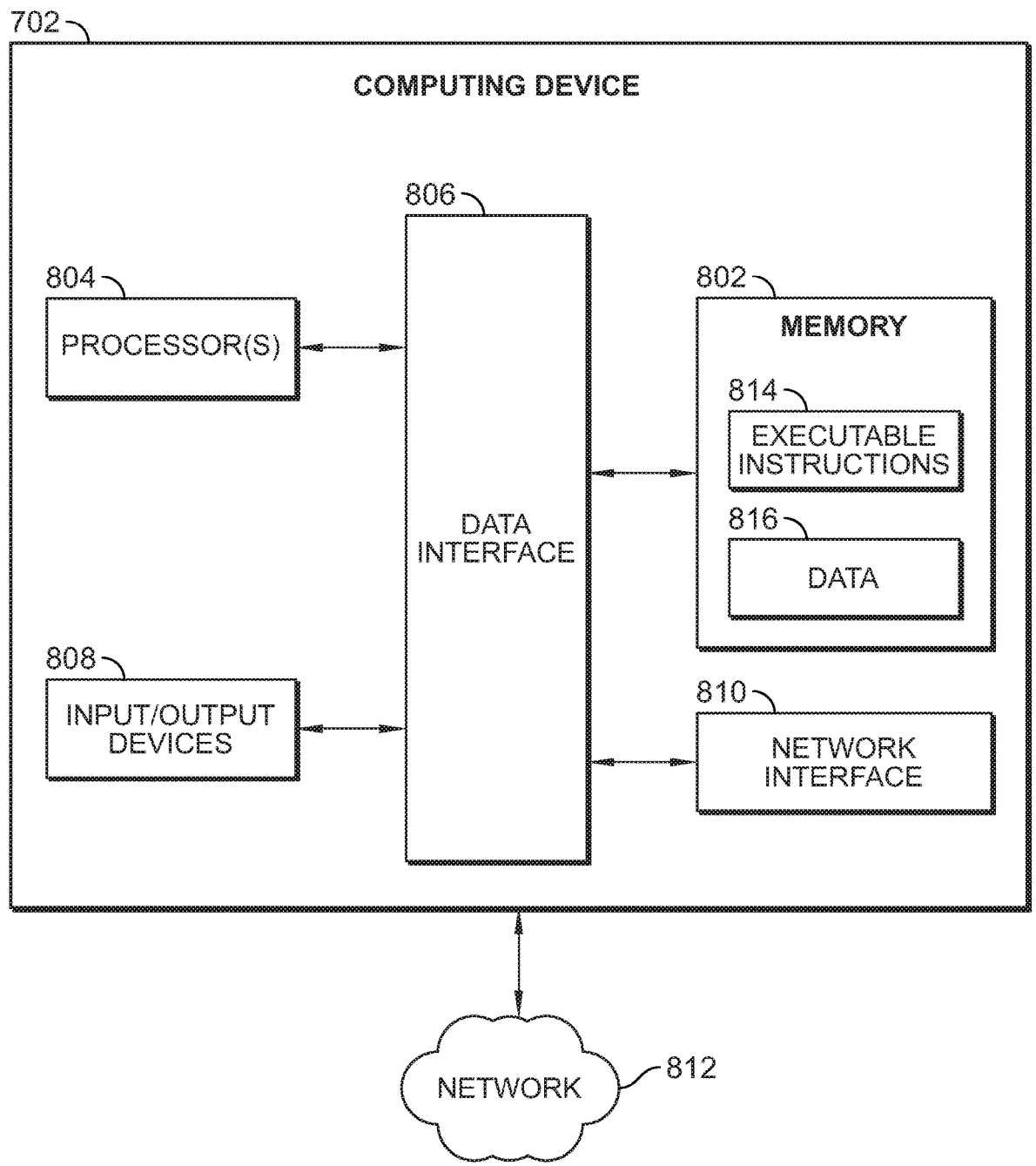
FIG. 8 is a block diagram of an illustrative embodiment of a computing device that is a component of the driving system of FIG. 5.

FIG. 8 is a block diagram of an illustrative embodiment of a computing device 702 that is a component of the vehicle system of FIG. 7. Computing device 702 comprises a memory device 802 that may be a single memory device or multiple devices for storing executable code to implement any portion of the pedestrian recognition methods disclosed herein, including algorithms, for example to implement the Siamese neural network training and deployment. Further contained in memory device 802 may be stored data, for example data representing features of each pedestrian activity. One or more processors 804 are coupled to memory device 802 by a data interface 806. Processor 804 may be any device(s) configured to execute one or more applications and analyze and process data according to embodiments of the pedestrian recognition methods. Processor 804 may be a single processor or a plurality of processors acting individually or in unison. Processor 804 may be, for example, a microprocessor, an application specific processor, or other device that may process and transform electronic data. Processor 804 executes the instructions stored on memory device 802. Memory device 802 may be integrated with processor 804 or be a separate devices. Illustrative types and features of memory device 802 include volatile and/or non-volatile memory. Various types of memory may be used, provided the type(s) are compatible with the system and its functions. Illustrative examples of memory types include, but are not limited to, various types of random access memory, static random access memory, read only memory, magnetic disk storage devices, optical storage media, and flash memory devices. This description of memory also applies, o the extent applicable to memory 512 that stores similar database 506 and dissimilar database 508.

Input/output devices 808 are coupled to data interface 806. This may include image capture devices and actuators, for example. A network interface 810 is also shown coupled to data interface 806, which may couple the computing device components to a private or public network 812.

Ground truth data collection may be accomplished using image capture devices positioned to obtain video or images to provide paired data. In an illustrative embodiment, two or more image capture devices, such as cameras, are mounted by a roadway, each with a different perspective but having overlapping areas of focus. The overlapping regions of the resulting images can be used to train a Siamese neural network on image similarity on pairs of images or a larger number of multiple images from the image capture devices. A pair or group of images captured at different times and not covering the same activity could be used to train on a dissimilarity metric.

The image capture devices may be mounted, for example on infrastructure poles at traffic intersections, or on other support structures. The image capture devices may also be mounted on a single vehicle at different mounting positions but having an overlapping area of interest.

A Siamese neural network may be trained on recognizing various types of activity, such as hand gestures, by obtaining image data from other than vehicle or roadway locations. For example, image capture devices may be mounted in a place of social or business gathering, e.g. a restaurant, cafeteria, bank, or other establishment where people may congregate. The image capture devices may be mounted on walls, for example with multiple possible pairings of cameras where they capture imagery on persons communicating with each other using gestures or other actions.

Annotations, even a small number, that are already available or have already been collected, can be used by the unsupervised model in a more efficient manner compared to traditional supervised models. The existing annotations allows the model to be trained on most or all possible combinations and permutations of input data pairs or groups that are drawn from this existing small annotated dataset, while still learning the capability to predict whether an input pair or group is similar or dissimilar.

Illustrative embodiments include a non-transitory computer-readable medium on which is stored computer code, which when executed on one or more processors causes a computer system to perform methods of pedestrian activity recognition as described herein. The term "computer readable medium" may be for example, a machine-readable medium capable of storing data in a format readable by a mechanical device. Examples of computer-readable media include for example, semiconductor memory, such as flash memory, a solid state drive, SRAM, DRAM, EPROM or EEPROM, magnetic media such as magnetic disks, optical disks, or other forms of computer readable media that can be functionally implemented to store code and data for execution of embodiments of the pedestrian activity recognition methods described herein.

Advantageously, illustrative embodiments of pedestrian activity recognition and prediction do not rely on massive amounts of annotations, as do conventional methods. As one skilled in the art would understand, pedestrian activity recognition and prediction are particularly difficult problems to solve, both with respect to accuracy and the amount of computing power required. Importantly, the classification or categorization of present embodiments focuses on detecting similarities and dissimilarities between multiple different activities. This metric learning approach may require orders of magnitude less annotated data for learning new activities or categories than conventional methods require. Clustering activities in this unsupervised manner using two or more images capture devices to obtained paired data may reduce processing time. Furthermore, disclosed illustrative embodiments of pedestrian recognition allow detection of unknown new activities as well as recognizing known activities. This allows the system to work with very little or no hand-labeled data. The use of multiple image capture devices concurrently recording pedestrian activity from different perspectives also provides an advantage over traditional methods by enabling the system to automatically capture grouped or paired data streams and unpaired data, to generate similar and dissimilar datasets, both of which are used to train the pedestrian recognition system.

Various types of neural networks may be used in the illustrative embodiments, provided they can be trained and deployed to recognize pedestrian activity. In an illustrative embodiment each neural network may be a convolution neural network with shared parameters. During feature extraction a similarity value is calculated and output that is derived from extraction of comparable hidden-layer features (feature extraction). Convolution neural networks can cover the temporal part of the spatio-temporal neural network. Convolution neural networks are particularly applicable to detecting features in images. Convolution neural networks move filters across an image and calculate a value related to the filter using a convolution operation. A filter may be associated with any feature that may be found in an image and may represent an aspect of the activity or person the system looks to identify. For example, a filter may be associated with whether a person is identified as running, such as by the position of the person's legs or tilt of the person's body. The filters may be assigned specific values, which then update themselves during a neural network training operation. A feature map is generated once a filter has passed over an image. Multiple filter layers may be used, which would generate additional feature maps. The filters produce translation invariance and parameter sharing. Pooling layers can be included to identify inputs to be used in subsequent layers. The process can include multiple convolution payers, each followed by a pooling layer. A fully connected layer may also be included prior to a classification output of the convolution neural network. Non-linearity layers, such as a rectified non-linear unit for example, may be implemented between convolution layers to improve the robustness of the neural network. In summary, an input is fed into a convolution layer, which may be followed by a nonlinearity layer, one or more additional convolution layers and nonlinearity layers may follow, before a pooling layer is provided, the sequence can continue until a fully connected layer reached.

Neural network training according to illustrative embodiments may be end-to-end for learning of spatiotemporal features. Alternatively, or in addition, feature extraction may be used with separate classification.

In illustrative embodiments of the pedestrian recognition method and system, a single neural network can capture spatial and temporal information, or one network may capture combined spatio-temporal information.

Various embodiments of the invention have been described, each having a different combination of elements. The invention is not limited to the specific embodiments disclosed, and may include different combinations of the elements disclosed, omission of some elements or the replacement of elements by the equivalents of such structures.

It is further noted that although the description of embodiments is directed primarily to pedestrian activity in the vicinity of a motor vehicle, the methods and systems may be applied to human or animal activity in other contexts. In general, disclosed embodiments may be applied to recurring activity that can be recognized by a trained neural network, and used to generate actions of a vehicle or other apparatus.

The invention claimed is:

1. A method of pedestrian activity recognition comprising:

training a Siamese neural network to recognize a plurality of pedestrian activities by training it on two or more inputs, wherein at least two of the two or more inputs are recordings of a same pedestrian activity from two or more separate training image capture devices;

deploying the Siamese neural network model with continual data collection from an additional image capture device to create a dataset of a plurality of activity clusters of similar activities in an unsupervised manner;

employing the Siamese neural network to annotate activities as predictive activity or not predictive activity to create an annotated predictive dataset and an annotated non-predictive dataset;

training a spatio-temporal intent prediction model using spatio-temporal data samples from the non-predictive annotated dataset and the spatio-temporal data sample from the predictive annotated dataset as input; and deploying the intent prediction model to assign a likelihood of a particular activity.

2. The method of pedestrian activity recognition of claim 1 wherein deploying the Siamese neural network model with continual data collection from the additional activity image capture device to cluster similar activities in an unsupervised manner comprises:

inputting into the Siamese neural network comprising the plurality of activity clusters:

output from the additional activity image capture device; and the dataset of the plurality of activity clusters;

determining by the Siamese neural network a measurement of similarity between the additional activity image capture device output and a data sample of each of the plurality of activity clusters to determine whether the additional activity matches an existing cluster sample; and detecting an activity if the additional activity image capture device output belongs to one of the plurality of activity clusters.

3. The method of pedestrian activity recognition of claim 2 further comprising creating a new cluster associated with the current activity output if the similarity measurement is outside of a designated measurement range for all of the plurality of activity clusters, and adding the new cluster to the plurality of activity clusters.

4. The method of pedestrian activity recognition of claim 1 wherein training the Siamese neural network to recognize the plurality of activities comprises:

creating a similar dataset from at least an output from a first training image capture device of the two or more training image capture devices and a synchronized output from a second training image capture device of the two or more training image capture devices, wherein the outputs reflect the same pedestrian activity;

creating a dissimilar dataset from the at least an output from the first training image capture device and a delayed output from the second training image capture device, wherein the outputs reflect different pedestrian activities; and creating a dataset comprising a plurality of activity clusters by training the Siamese neural network on the similar dataset and the dissimilar dataset.

5. The method of pedestrian activity recognition of claim 4 further comprising refining the similar dataset and the dissimilar dataset by applying a rule-based heuristics to a delayed output from the second training image capture device and the output of the first training image capture device to evaluate for dissimilarities.

6. The method of pedestrian activity recognition of claim 1 wherein employing the Siamese neural network to annotate activities as predictive activity or not predictive activity to create an annotated predictive dataset and an annotated non-predictive dataset comprises:

executing an annotating algorithm that employs the Siamese neural network, to automatically annotate image capture device output associated with activity captured during a designated time period prior to a detected activity to label it as predictive of the detected activity to create a dataset annotated as predicting activities; and creating, from image capture device output in which activities are not detected, negative samples of pedestrian activity captured during a designated time period prior to a time segment in which one of the plurality of activity clusters was not detected and labeling the negative sample as not predictive of the one of the plurality of activity clusters to create a dataset annotated as not predicting activities.

7. The method of pedestrian activity recognition of claim 1 wherein deploying the intent prediction model to assign a likelihood of a particular activity comprises assigning a "1" if activity is predicted and assigning a zero if activity is not predicted.

8. The method of pedestrian activity recognition of claim 1 further comprising executing an automatic vehicle maneuver based on assignment of the likelihood of the particular activity.

9. A system for recognizing pedestrian activity comprising:

one or more processors;

one or more storage devices on which is stored computer code, the computer code comprising a Siamese neural network;

wherein executing the computer code causes the one or more processors to perform a method comprising:

training the Siamese neural network on two or more inputs to recognize a plurality of pedestrian activities, wherein at least two of the two or more inputs are recordings of a same pedestrian activity from two or more separate training image capture devices;

deploying the Siamese neural network model with continual data collection from an additional image capture device to create a dataset of a plurality of activity clusters of similar activities in an unsupervised manner;

employing the Siamese neural network to annotate activities as predictive activity or not predictive activity to create an annotated predictive dataset and an annotated non-predictive dataset;

training a spatio-temporal intent prediction model using spatio-temporal data samples from the non-predictive annotated dataset and the spatio-temporal data sample from the predictive annotated dataset as input; and deploying the intent prediction model to assign a likelihood of a particular activity.

10. The system of claim 9 wherein deploying the Siamese neural network model with continual data collection from the additional activity image capture device to cluster similar activities in an unsupervised manner comprises the computer code causing the one or more processors to perform the steps of:

inputting into the Siamese neural network comprising the plurality of activity clusters:

output from the additional activity image capture device; and the dataset of the plurality of activity clusters;

determining by the Siamese neural network a measurement of similarity between the additional activity image capture device output and a data sample of each of the plurality of activity clusters to determine whether the additional activity matches an existing cluster sample; and detecting an activity if the additional activity image capture device output belongs to one of the plurality of activity clusters.

11. The system of claim 10 further comprising the one or more storage devices having computer code stored thereon which when executed causes the one or more processors to perform the steps of creating a new cluster associated with the current activity output if the similarity measurement is outside of a designated measurement range for all of the plurality of activity clusters, and adding the new cluster to the plurality of activity clusters.

12. The system of claim 9 wherein training the Siamese neural network to recognize the plurality of activities comprises the computer code causing the one or more processors to perform the steps of:

creating a similar dataset from at least an output from a first training image capture device of the two or more training image capture devices and a synchronized output from a second training image capture device of the two or more training image capture devices, wherein the outputs reflect the same pedestrian activity;

creating a dissimilar dataset from the at least an output from the first training image capture device and a delayed output from the second training image capture device, wherein the outputs reflect different pedestrian activities; and creating a dataset comprising a plurality of activity clusters by training the Siamese neural network on the similar dataset and the dissimilar dataset.

13. The system of claim 12 further comprising the one or more storage devices having computer code stored thereon which when executed causes the one or more processors to perform the steps of refining the similar dataset and the dissimilar dataset by applying a rule-based heuristics to a delayed output from the second training image capture device and the output of the first training image capture device to evaluate for dissimilarities.

14. The system claim 9 wherein employing the Siamese neural network to annotate activities as predictive activity or not predictive activity to create an annotated predictive dataset and an annotated non-predictive dataset comprises the computer code causing the one or more processors to perform the steps of:

executing an annotating algorithm that employs the Siamese neural network, to automatically annotate image capture device output associated with activity captured during a designated time period prior to a detected activity to label it as predictive of the detected activity to create a dataset annotated as predicting activities; and creating, from image capture device output in which activities are not detected, negative samples of pedestrian activity captured during a designated time period prior to a time segment in which one of the plurality of activity clusters was not detected and labeling the negative sample as not predictive of the one of the plurality of activity clusters to create a dataset annotated as not predicting activities.

15. The system of claim 9 wherein deploying the intent prediction model to assign a likelihood of a particular activity comprises the computer code causing the one or more processors to perform the step of assigning a "1" if activity is predicted and assigning a zero if activity is not predicted.

16. The system of claim 9 further comprising the one or more storage devices having computer code stored thereon which when executed causes an automatic vehicle maneuver based on assignment of the likelihood of the particular activity.

17. An autonomously or semi-autonomously controlled vehicle, wherein the vehicle comprises the system for recognizing pedestrian activity of claim 9.

18. The vehicle of claim 17 further comprising:

a vehicle control component; and an actuator electronically connected to the vehicle control component;

wherein the one or more storage devices have stored thereon computer code, which when executed caused the actuator to initiate the vehicle maneuver through the vehicle control component.

19. A non-transitory computer-readable medium on which is stored computer code, which when executed on one or more processors causes a computer system to perform a method comprising:

training a Siamese neural network to recognize a plurality of pedestrian activities by training it on two or more inputs, wherein at least two of the two or more inputs are recordings of a same pedestrian activity from two or more separate training image capture devices;

deploying the Siamese neural network model with continual data collection from an additional image capture device to create a dataset of a plurality of activity clusters of similar activities in an unsupervised manner;

employing the Siamese neural network to annotate activities as predictive activity or not predictive activity to create an annotated predictive dataset and an annotated non-predictive dataset;

training a spatio-temporal intent prediction model using spatio-temporal data samples from the non-predictive annotated dataset and the spatio-temporal data sample from the predictive annotated dataset as input; and deploying the intent prediction model to assign a likelihood of a particular activity.

20. The non-transitory computer-readable medium of claim 19 wherein deploying the Siamese neural network model with continual data collection from the additional activity image capture device to cluster similar activities in an unsupervised manner comprises:

inputting into the Siamese neural network comprising the plurality of activity clusters:

output from the additional activity image capture device; and the dataset of the plurality of activity clusters;

determining by the Siamese neural network a measurement of similarity between the additional activity image capture device output and a data sample of each of the plurality of activity clusters to determine whether the additional activity matches an existing cluster sample; and detecting an activity if the additional activity image capture device output belongs to one of the plurality of activity clusters.

21. The non-transitory computer-readable medium of claim 20 further comprising creating a new cluster associated with current activity output if the similarity measurement is outside of a designated measurement range for all of the plurality of activity clusters, and adding the new cluster to the plurality of activity clusters.

22. The non-transitory computer-readable medium of claim 19 wherein training the Siamese neural network to recognize the plurality of activities comprises:
- creating a similar dataset from at least an output from a first training image capture device of the two or more training image capture devices and a synchronized output from a second training image capture device of the two or more training image capture devices, wherein the outputs reflect the same pedestrian activity;
- creating a dissimilar dataset from the at least an output from the first training image capture device and a delayed output from the second training image capture device, wherein the outputs reflect different pedestrian activities; and
- creating a dataset comprising a plurality of activity clusters by training the Siamese neural network on the similar dataset and the dissimilar dataset.

23. The non-transitory computer-readable medium of claim 22 further comprising refining the similar dataset and the dissimilar dataset by applying a rule-based heuristics to a delayed output from the second training image capture device and the at least an output of the first training image capture device to evaluate for dissimilarities.

24. The non-transitory computer-readable medium of claim 19 wherein employing the Siamese neural network to annotate activities as predictive activity or not predictive activity to create an annotated predictive dataset and an annotated non-predictive dataset comprises:
- executing an annotating algorithm that employs the Siamese neural network, to automatically annotate image capture device output associated with activity captured during a designated time period prior to a detected activity to label it as predictive of the detected activity to create a dataset annotated as predicting activities; and
- creating, from image capture device output in which activities are not detected, negative samples of pedestrian activity captured during a designated time period prior to a time segment in which one of the plurality of activity clusters was not detected and labeling the negative sample as not predictive of the one of the plurality of activity clusters to create a dataset annotated as not predicting activities.

25. The non-transitory computer-readable medium of claim 19 wherein deploying the intent prediction model to assign a likelihood of a particular activity comprises assigning a "1" if activity is predicted and assigning a zero if activity is not predicted.

26. The non-transitory computer-readable medium of claim 19 further comprising executing an automatic vehicle maneuver based on assignment of the likelihood of the particular activity.

* * * * *